United States Patent [19]

Jacaruso et al.

[11] Patent Number: 4,853,172
[45] Date of Patent: Aug. 1, 1989

[54] METHOD OF FABRICATING TUBULAR COMPOSITE STRUCTURES

[75] Inventors: Gary J. Jacaruso, Milford; Peter B. Leoni, Bethany, both of Conn.

[73] Assignee: United Technologies Corporation, Hartford, Conn.

[21] Appl. No.: 126,664

[22] Filed: Dec. 1, 1987

[51] Int. Cl.⁴ .................... B29C 43/10; B29C 43/56
[52] U.S. Cl. .................... 264/571; 264/257; 264/314; 264/516
[58] Field of Search ............... 264/510, 511, 512, 313, 264/314, 315, 257, 258, 102, 320, 571, 516

[56] References Cited

U.S. PATENT DOCUMENTS

| | | | |
|---|---|---|---|
| 2,711,985 | 6/1955 | Olson | 264/314 |
| 3,135,640 | 6/1964 | Kepka | 264/512 |
| 3,962,393 | 6/1976 | Blad | 264/314 |
| 4,126,659 | 11/1978 | Blad | 264/314 |
| 4,132,577 | 1/1979 | Wintermantel | 264/314 |
| 4,202,856 | 5/1980 | Frikken | 264/258 |
| 4,634,140 | 1/1987 | Stroi | 264/511 |
| 4,704,240 | 11/1987 | Reavely et al. | |

Primary Examiner—James Lowe
Assistant Examiner—Jeremiah F. Durkin, II

[57] ABSTRACT

A method of making tubular composite structures that simplifies vacuum bag sealing. The method comprises disposing a prepreg structure within a tool that has at least one hole. The prepreg is disposed adjacent a mandrel. The mandrel comprises an inner bag containing a solid filler core that comprises about 75% to about 95% of the volume of the inner bag. The hole is enclosed with a vacuum bag thereby forming a void space between said vacuum bag and said prepreg. The void space is evacuated. The vacuum bag applies a predetermined pressure to the inner bag thus causing the inner bag to apply a substantially uniform predetermined pressure to the surface of the prepreg. The prepreg is exposed to heat.

1 Claim, 2 Drawing Sheets

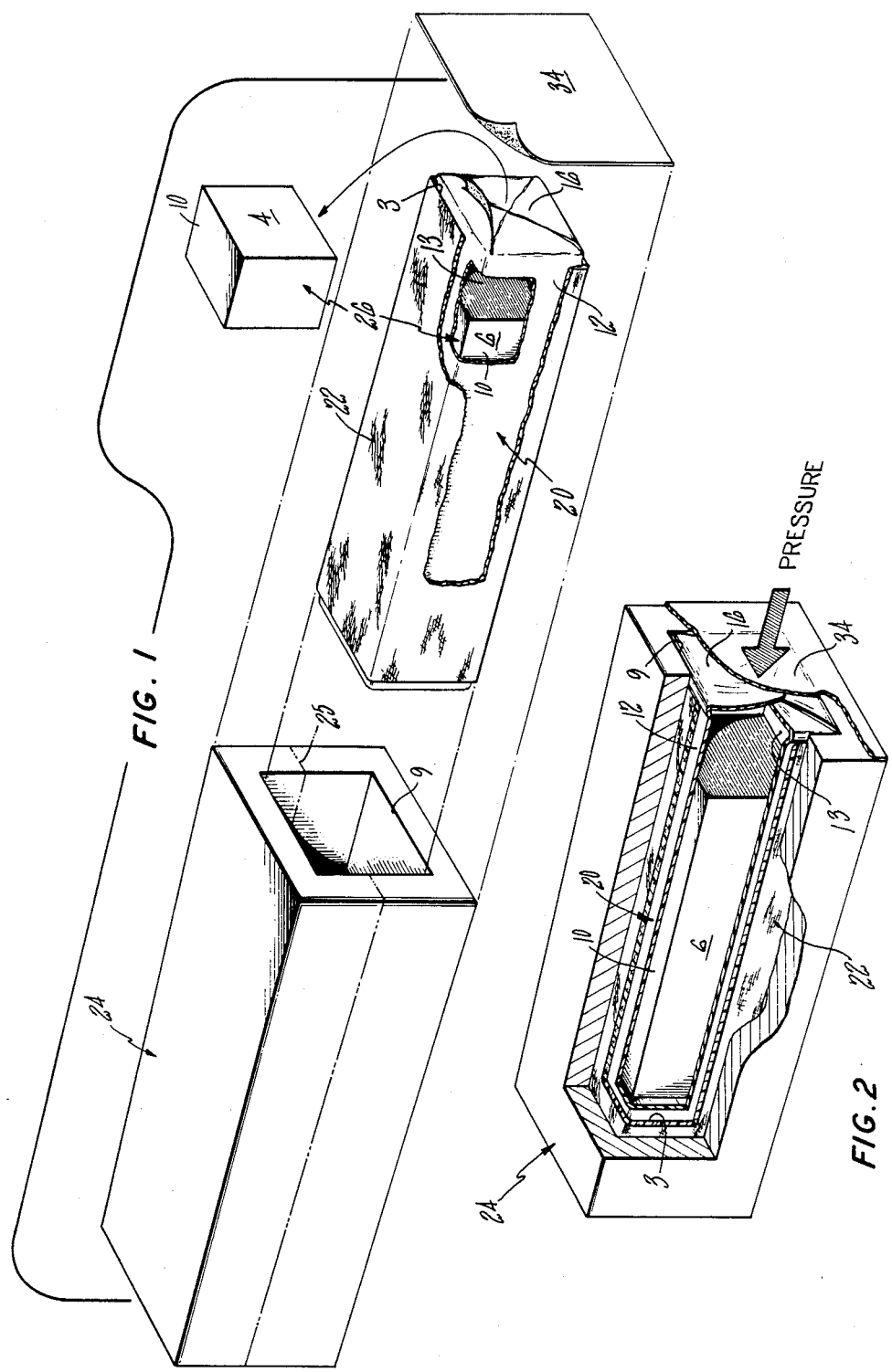

METHOD OF FABRICATING TUBULAR COMPOSITE STRUCTURES

This invention was made with U.S. Government support under contract awarded by the U.S. Government. The Government has certain rights in this invention.

DESCRIPTION

1. Technical Field

The field of this invention relates to methods of making composite articles.

2. Background Art

Composite materials are of great current interest because they provide a very favorable combination of high strength and low density. Typically, a composite material is comprised of fibers of graphite embedded within an epoxy, phenolic or other polymer resin matrix. The more advanced composites which have particularly favorable high strength to density ratio properties are especially attractive for aerospace applications. Typical of other advanced aerospace materials, they present comparative processing difficulties; it is insufficient to make a simple layup of the fibers and resin followed by room temperature curing. Aerospace composite materials not only involve more difficult to fabricate resins but often essentially defect-free finished parts must be produced.

Multicell (multitubular) composite structures have been produced by passing pressure bags through each tube then sealing these pressure bags to each other and to the outer tool or vacuum bag. A vacuum is drawn on the vacuum bag (not the pressure bag) and external autoclave pressure is applied to the pressure bags. However, this method is labor intensive and can be unreliable because of the complexity of the bag end seals. In addition, the bags are susceptible to leakage and can apply uneven pressure to the composite prepreg resulting in bridging defects (voids in composite corners caused by pressure deficiencies). Alternatively rigid mandrels are used as the reaction member in a compression mold (matched metal). There are various types of mandrels (e.g., mandrels) foam. However, mandrels do not adapt well to changing internal geometry, are unforgiving of laminate bulk variations and are often unmanageably weighty.

Accordingly, there has been a constant search in this field of art for new methods of making composite tubular structures.

DISCLOSURE OF INVENTION

This invention is directed to a method of making tubular composite structures that simplifies vacuum bag sealing. The method comprises disposing a prepreg structure within a tool that has at least one hole. The prepreg is disposed adjacent a mandrel. The mandrel comprises an inner bag containing a solid filler core that comprises about 75% to about 95% of the volume of the inner bag. The hole is enclosed with a vacuum bag thereby forming a void space between said vacuum bag and said prepreg. The void space is evacuated. The vacuum bag applies a predetermined pressure to the inner bag thus causing the inner bag to apply a substantially uniform predetermined pressure to the surface of the prepreg. The prepreg is exposed to heat.

This invention makes a significant advance in the field of composite fabrication by providing methods that simplify vacuum bag sealing thereby increasing molding reliability.

The foregoing and other features and advantages of the present invention will become more apparent from the following description and accompanying drawings.

BRIEF DESCRIPTION OF DRAWINGS

FIG. 1 is an exploded perspective view partly broken away and partly in section of the mold assembly used with the method of this invention.

FIG. 2 is a view similar to FIG. 1, but shown fully assembled.

BEST MODE FOR CARRYING OUT THE INVENTION

Figure 3:
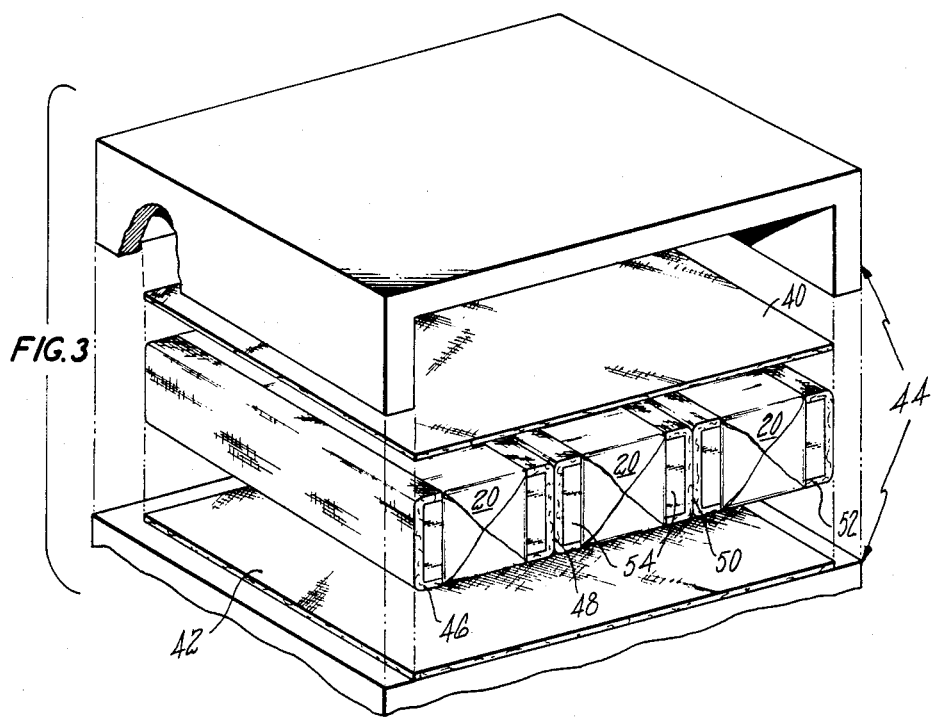
FIG. 3 is an exploded perspective view of a multicell mold assembly used with the method of this invention.

FIG. 1 illustrates an exploded perspective view partially cutaway of the method of this invention. A conventional composite prepreg 22 having a cell 3 is laid up on a mandrel 20 adapted to be inserted through opening 9 in a tool (mold) 24 defining the outer mold line of the finished article. During curing and under pressure, the tool provides exterior support to the prepreg 22 as it is in substantially complete contact with the outer surface of the prepreg 22.

The mandrel 20 is disposed within cell 3. The mandrel 20 comprises a solid filler core (e.g. wood, closed cell foam) 6 that has substantially the same length as the composite to be molded disposed within a bag. The core 6 is enveloped or disposed within a nonstick airtight elastomer polymer bag (e.g. fluoropolymer bag) 12. The bag 12 is sized so that there is about a 5% to about 25% air space 13 within the bag 12.

The mandrel 20 can be made by providing a filler core 26 that is oversized in length by about 5% to about 25% compared to the composite article to be molded. The core 26 is segmented into sections 4 and 6 where section 4 comprises about 5% to about 25% of the volume of core 6. Sections 4 and 6 are coated with a release agent 10, a TEFLON (TM) fluorocarbon (Du Pont de Nemours, Wilmington, Del.) release agent 10. A polymer bag 12 is molded (e.g. cured) around core 6. Once cured, an end portion 16 is cut open and section 4 is removed. The end portion 16 of bag 12 is resealed with section 6 remaining within and is usable for molding composite tubular structures as described hereinafter.

Prepreg composite 22 is laid up according to the desired fiber orientation over the bagged core 6 (e.g. mandrel 20). The resulting ternary system (prepreg-bag-core) is placed within mold 24 (which may be a two-piece structure as shown by phantom line 25) and a vacuum bag (e.g. nylon sheet) 34 is sealed (e.g. clamped, bonded) to the opened end 9 of the tool 24. Alternatively, a vacuum bag may be disposed around the entire tool 24 particularly where a composite article is being molded using a plurality of the elastomeric bags 12. The bag material 34 is capable of expanding under pressure and capable of withstanding pressures up to about 1034 kiloPascals (kPa) (150 pounds per square inch (psi)) and should also be air tight. An exemplary material is No. 1453 silicone available from Mosites Rubber. Co. (Fort Worth, Tex. The volume of air between the bag 34 and the prepreg 22 is evacuated.

The entire assembly is placed in an autoclave where it is exposed to pressures of about 172 KPa (25 psi) to about 1034 KPa (150 psi) as illustrated in FIG. 2. This causes the bag 34 to transfer a substantially uniform pressure via the air (e.g. in air space 13) within bag 12 to the surface of the prepreg 22. The composite prepreg 1 is typically exposed to temperatures of about 121 degrees centigrade (°C.) (250° F.) to about 175° C. (350° F.) in order to cure the part.

Figure 4:
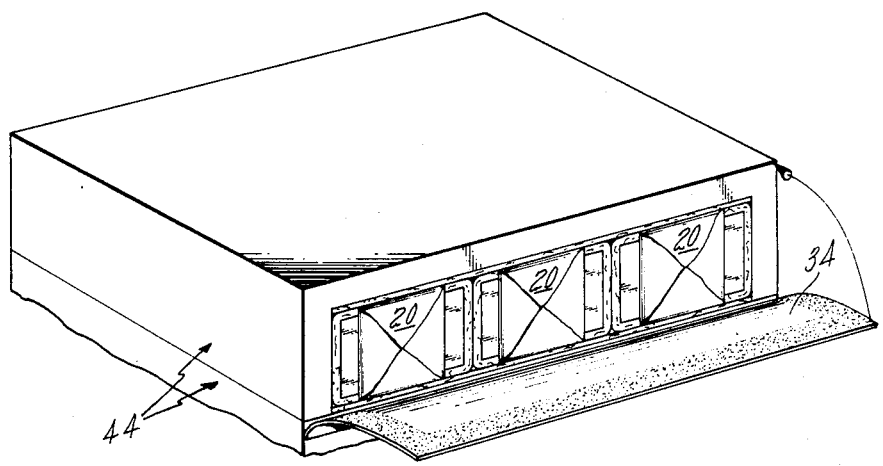
FIG. 4 is a side view similar to FIG. 3 but shown assembled, and including a vacuum bag for completing the mold assembly.

FIG. 3 illustrates an exploded perspective view of the method of the present invention used for the fabrication of multicell composite structures. Composite laminates 40 and 42 are laid up on the upper and lower mold surfaces of a compaction forming tool 44 defining the outer mold line of the composite article. Mandrels 20, such as those described hereinbefore, are appropriately located in the compaction forming tool 44 such that support members (e.g., vertical spar wall laminates 46, 48, 50 and 52) may be placed therebetween. Caul plates 54 may be utilized for layup of the vertical spar wall laminates thereby facilitating assembly and compaction of the web and flange portions thereof. Alternatively, the support members may be laid up over mandrels 20. The compaction tool 44 is then mated, as depicted in FIG. 4, and a vacuum bag 34 is sealed to the open end 9 of the compaction forming tool 44. The composite layup is then compacted and cured in a conventional manner by evacuating the cavity occupied by the composite laminates, and exposing the entire assembly to heat and pressure in an autoclave.

The order of the above method may change so long as it does not deleteriously affect the process as a whole. In addition, although the above method has been described in terms of molding a composite shaped like a rectangle having an opening at one end, this process may be used for a variety of other shapes such as cylinders, rectangles, and air foil shapes. Further this process is particularly well adapted for rectangles or cylinders that are open at both ends and other such shapes. The term tubular is meant to encompass all such shapes. For example, a rectangular open at both ends could be made similar to that described above or could utilize a mold that is open at both ends and elastomeric sheets to cover both ends. Also, the prepreg may comprise a plurality of pieces which when cocured form a tubular structure. Any number of myriad other combinations and configurations may be imagined that utilize the bagged core concept.

This method can be utilized to make conventional composites from conventional composite precursor materials. Examples of resins include epoxy, phenolic and polyester. An example is 5225 epoxy available Narmco (Anaheim, Calif. Graphite fiber is an exemplary reinforcing material and prepregs of this material are available from Narmco.

This invention can be utilized to fabricate a variety of multicell composite parts such as wings, rotor blades and rudders. This invention substantially reduces the number of cumbersome vacuum seals, typically required in the fabrication of multicell composite articles, inasmuch as a single sheet of vacuum bagging material may be placed across a plurality of cells and sealed along its peripheral edge. Accordingly, the method of the present invention is far less labor intensive and facilitates a far more reliable seal interface by providing a more reliable seal method.

This concept facilitates the transfer of a substantially uniform pressure via air while utilizing a solid core as a mandrel for fiber layup. In addition it displaces a known volume of air to prevent local collapse of the bag during pressurization. The invention furthermore provides a method which employs a reusable mandrel, thereby reducing the costs associated with disposable bagging materials typically utilized in multicell construction.

It should be understood that the invention is not limited to the particular embodiment shown and described herein, but that various changes and modifications may be made without departing from the spirit or scope of this concept as defined by the following claims.

We claim:

1. A method particularly adapted for fabricating a fiber reinforced resin composite article having a tubular structure comprising:
   (a) disposing a prepreg structure within a tool having at least one hole;
   (b) said prepreg structure disposed adjacent a mandrel, said mandrel comprising an inner bag containing a solid filler core that comprises about 75% to about 95% of the volume of the inner bag;
   (c) enclosing said hole with a vacuum bag thereby forming a void space between said vacuum bag and said prepreg;
   (d) evacuating said void space;
   (e) causing said vacuum bag to apply a predetermined pressure to said inner bag thus causing said inner bag to apply a substantially uniform predetermined pressure to the surface of said prepreg; and
   (f) exposing said prepreg to heat.

* * * * *